(12) United States Patent
Dunn et al.

(10) Patent No.: US 7,445,399 B2
(45) Date of Patent: Nov. 4, 2008

(54) LOW PROFILE GIMBAL

(75) Inventors: Jeffrey Harold Dunn, San Diego, CA (US); Ian Trevor Brown, San Diego, CA (US)

(73) Assignee: Solar Turbines Incorporated, San Diego, CA (US)

( * ) Notice: Subject to any disclaimer, the term of this patent is extended or adjusted under 35 U.S.C. 154(b) by 200 days.

(21) Appl. No.: 10/950,599

(22) Filed: Sep. 28, 2004

(65) Prior Publication Data

US 2006/0088371 A1 Apr. 27, 2006

(51) Int. Cl.
F16D 1/12 (2006.01)

(52) U.S. Cl. .................. 403/150; 403/119; 403/125

(58) Field of Classification Search ............ 403/119, 403/120, 150, 151, 154, 125.9; 248/121, 248/122.1, 178.1, 364, 288.11, 296.1, 182.1, 248/181.1, 181.2, 184.1, 185.1, 487, 287.1; 384/36

See application file for complete search history.

(56) References Cited

U.S. PATENT DOCUMENTS

| 2,035,733 | A | 3/1936 | Wall ............................ 248/23 |
| 3,018,992 | A | 1/1962 | Lore |
| 3,525,448 | A | 8/1970 | Bauer ......................... 214/778 |
| 3,923,349 | A | 12/1975 | Herbst ......................... 308/26 |
| 3,970,274 | A | 7/1976 | Resk ............................ 248/185 |
| 4,243,192 | A | 1/1981 | Johnson ....................... 244/215 |
| 4,243,339 | A | 1/1981 | Dickerson ..................... 403/4 |
| 4,359,823 | A | 11/1982 | White ......................... 33/364 |
| 4,659,053 | A | 4/1987 | Holley et al. ................. 248/663 |
| 4,786,202 | A * | 11/1988 | Arnold et al. ................. 403/79 |
| 4,808,023 | A | 2/1989 | Arnold et al. ............... 403/157 |
| 4,889,458 | A * | 12/1989 | Taylor ......................... 411/383 |
| 5,076,370 | A | 12/1991 | Stubben et al. ............. 172/781 |
| 5,271,511 | A * | 12/1993 | Daugherty et al. ........ 213/75 R |
| 5,443,527 | A * | 8/1995 | Wilson ......................... 623/49 |
| 5,641,147 | A * | 6/1997 | Pena .......................... 473/552 |
| 6,431,987 | B1 | 8/2002 | Tushar et al. ............... 464/112 |
| 6,454,229 | B1 | 9/2002 | Voigt et al. ............... 248/182.1 |
| 6,691,969 | B2 | 2/2004 | Fretschner et al. .......... 248/393 |
| 2003/0006360 | A1 | 1/2003 | Hatam-Tabrizi et al. |

FOREIGN PATENT DOCUMENTS

| DE | 20004850 U1 | 9/2000 |
| EP | 0390235 | 10/1990 |
| FR | 704740 | 5/1931 |

* cited by examiner

*Primary Examiner*—Daniel P. Stodola
*Assistant Examiner*—Joshua T Kennedy
(74) *Attorney, Agent, or Firm*—Finnegan, Henderson, Farabow, Garrett & Dunner

(57) ABSTRACT

A gimbal includes a first lug housing. The first lug housing includes a first base plate and a first lug protruding from the second surface of the first base plate. The gimbal also includes a second lug housing. The second lug housing includes a second base plate and a second lug protruding from the second surface of the second base plate. In addition, the gimbal includes a shaft passing through the first and second lugs, thereby connecting the first lug housing to the second lug housing, such that the first base plate is facing the second base plate. The gimbal also includes a first void in the second base plate, opposite the first lug, such that the first lug extends into the first void of the second base plate.

17 Claims, 5 Drawing Sheets

LOW PROFILE GIMBAL

TECHNICAL FIELD

The present disclosure is directed to a gimbal and, more particularly, to a low profile gimbal.

BACKGROUND

A gimbal is a device for attaching objects to one another. A gimbal typically includes at least two bases, each for mounting on a different object. The bases are pivotally attached to one another, allowing some degree of movement of the objects relative to one another, about at least one axis of rotation. Gimbals are commonly used to hold equipment stable when mounted to flexible and/or moving surfaces.

The movements of the objects to which the gimbals are mounted create loads in the gimbals. The ability of a gimbal to withstand loads is dependent on several factors, including, among other things, the overall size, weight, and materials of the gimbal; the size, shape, orientation, and placement of its components; and the use of any reinforcing structure. More specifically, factors in the ability of a gimbal to withstand lateral loads include the distribution of loads among its components, as well as the distance between the mounting surfaces of the gimbal. The greater the distance between the mounting surfaces, the higher the stresses in the gimbal resulting from any particular load will be.

The strength of a gimbal may be improved by increasing its size or, more specifically, the thickness of the materials from which it is made. However, larger and/or thicker components are also heavier than their smaller and/or thinner counterparts. For many applications, particularly in the aerospace and marine industries, where gimbals are often used, size and weight can be critical design parameters. Further, as discussed above, increases in the distance between the mounting surfaces increase the stresses in the gimbal for any given load. Therefore, simply increasing the size of the gimbal may not achieve the desired improvement in the ability of the gimbal to withstand loads. Thus, increases in size and/or weight may simply not be acceptable solutions. A need exists for a gimbal with improved strength without the penalty of additional size and/or weight.

Systems have been developed for pivotally mounting objects relative to one another. For example, U.S. Pat. No. 3,923,349, issued to Herbst on Dec. 2, 1975 ("the '349 patent"), teaches a universal bearing support, pivotable about two axes. The '349 patent teaches a lower base plate and an upper base plate pivotable with respect to one another. A spherical bearing assembly allows for both longitudinal pivoting around a center bolt and lateral pivoting about a spherical bearing. The '349 patent further provides elastomeric pads to attenuate shock and/or vibration.

Although the system of the '349 patent may allow for both longitudinal and lateral pivoting and provides some absorption of shock and/or vibration, it does not provide any particular structure for enhancing the ability of the device to withstand loads. Further, the elastomeric pads only act in shear, and thus, do not have any effect on the ability of the device to withstand lateral loads. Also, the '349 patent discloses no structure for evenly distributing loads among its components, nor does it disclose reinforcing structure of any kind.

The disclosed gimbal is directed toward overcoming one or more of the problems set forth above.

SUMMARY OF THE INVENTION

In one aspect, the present disclosure is directed to a gimbal, including a first lug housing. The first lug housing includes a first base plate having a first surface and a second surface opposite the first surface. The first lug housing also includes a first lug having a proximal end attached to the second surface of the first base plate and a distal end distanced from the second surface of the first base plate. The gimbal also includes a second lug housing. The second lug housing includes a second base plate having a first surface and a second surface opposite the first surface. The second lug housing also includes at least one second lug having a proximal end attached to the second surface of the second base plate and a distal end distanced from the second surface of the second base plate. In addition, the gimbal includes a shaft passing through the first lug and the at least one second lug, thereby connecting the first lug housing to the second lug housing, such that the second surface of the first base plate is facing the second surface of the second base plate. The gimbal also includes a first void in the second base plate, opposite the first lug, such that the first lug extends into the first void beyond the second surface of the second base plate.

In another aspect, the present disclosure is directed to a gimbal, including a first lug housing. The first lug housing includes a first base plate having a first surface and a second surface opposite the first surface. The first lug housing also includes a first lug having a proximal end attached to the second surface of the first base plate and a distal end distanced from the second surface of the first base plate. The gimbal also includes a second lug housing. The second lug housing includes a second base plate having a first surface and a second surface opposite the first surface. The second lug housing also includes a second lug and a third lug, each having a proximal end attached to the second surface of the second base plate and a distal end distanced from the second surface of the second base plate. In addition, the gimbal includes a shaft passing through said lugs, thereby connecting the first lug housing to the second lug housing, such that the second surface of the first base plate is facing the second surface of the second base plate. The shaft is mounted in the first lug with a bearing, enabling pivotal movement of the lug housings relative to one another about at least one axis. The gimbal also includes a pair of bearing retaining sleeves mounted on the shaft between the bearing and the second and third lugs and configured to assist in distributing loads between the second lug and third lug.

In another aspect, the present disclosure is directed to a gimbal, including a first lug housing. The first lug housing includes a first base plate having a first surface and a second surface opposite the first surface. First lug housing also includes a first lug having a proximal end attached to the second surface of the first base plate and a distal end distanced from the second surface of the first base plate. The gimbal also includes a second lug housing. The second lug housing includes a second base plate having a first surface and a second surface opposite the first surface. The second lug housing also includes a second lug and a third lug, each having a proximal end attached to the second surface of the second base plate and a distal end distanced from the second surface of the second base plate. In addition, the gimbal includes a shaft passing through said lugs, thereby connecting the first lug housing to the second lug housing, such that the second surface of the first base plate is facing the second surface of the second base plate. The shaft is mounted in the first lug with a bearing, enabling pivotal movement of the lug housings relative to one another about at least one axis. The gimbal also includes a reinforcing member spanning between and attached to the second and third lugs at the proximal ends.

DETAILED DESCRIPTION

Reference will now be made in detail to the drawings. Wherever possible, the same reference numbers will be used throughout the drawings to refer to the same or like parts.

Figure 1:
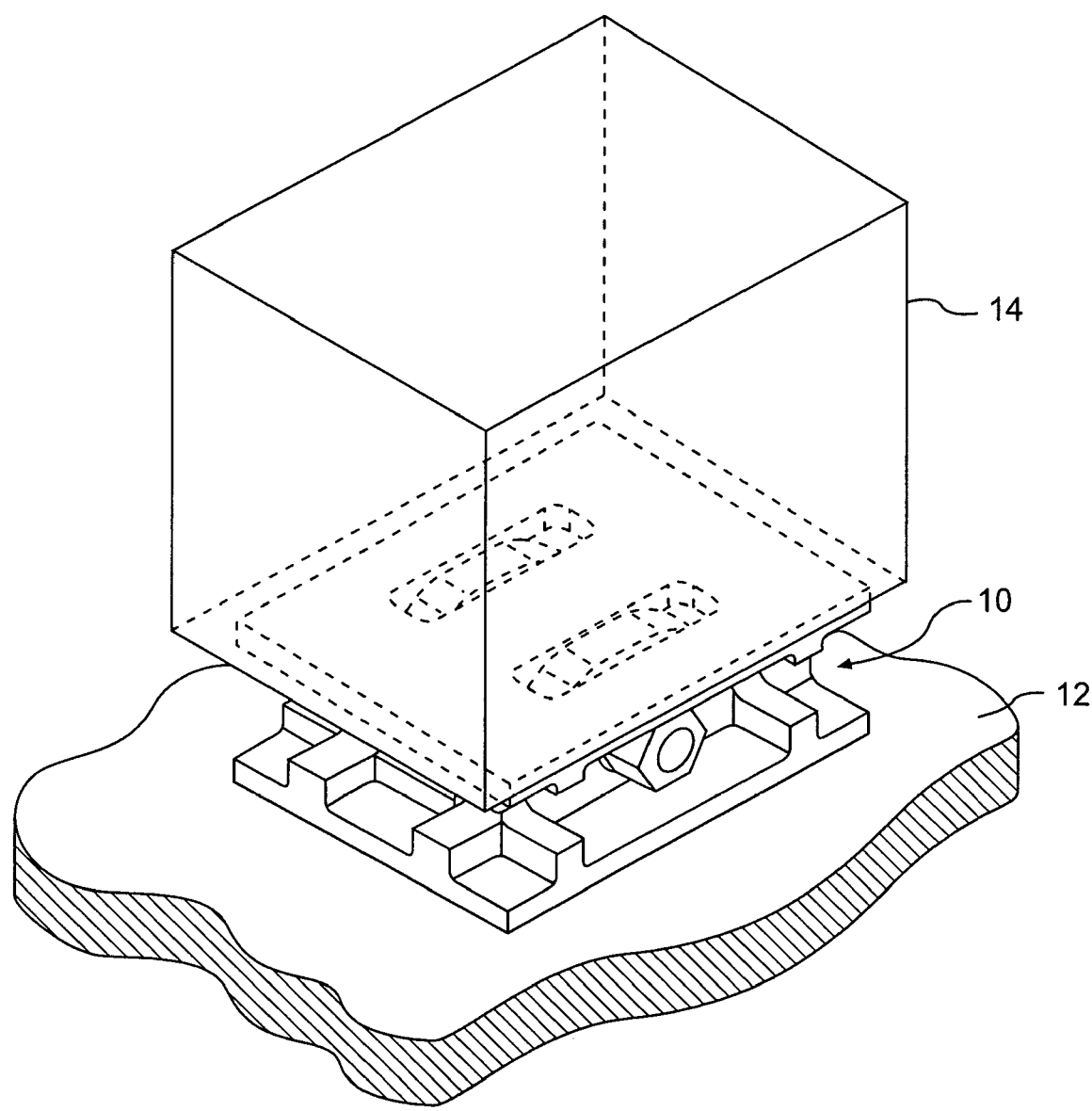
FIG. 1 is a diagrammatic illustration of an object mounted on a gimbal according to an exemplary disclosed embodiment.

FIG. 1 illustrates an exemplary embodiment of a gimbal 10 mounted on top of a support surface 12 and to the bottom of an object 14. Although gimbal 10 has been shown and described in a particular orientation, gimbal 10 may be mounted upside-down as compared to the figures or in any other orientation. Further, Although object 14 is shown to be roughly the same size as gimbal 10, object 14 may be significantly larger or smaller relative to gimbal 10. Also, more than one gimbal 10 may be used to mount object 14 to support surface 12, particularly if object 14 is mounted to more than one support surface or if support surface 12 is flexible.

Object 14 may be any structure, instrument, or piece of equipment that is desired to be kept level despite tilting of the surface to which it is mounted. Support surface 12 may be any flexible and/or moving surface, such as a vehicle, a floating structure, or other structures or equipment that flex and/or otherwise move.

Figure 2:
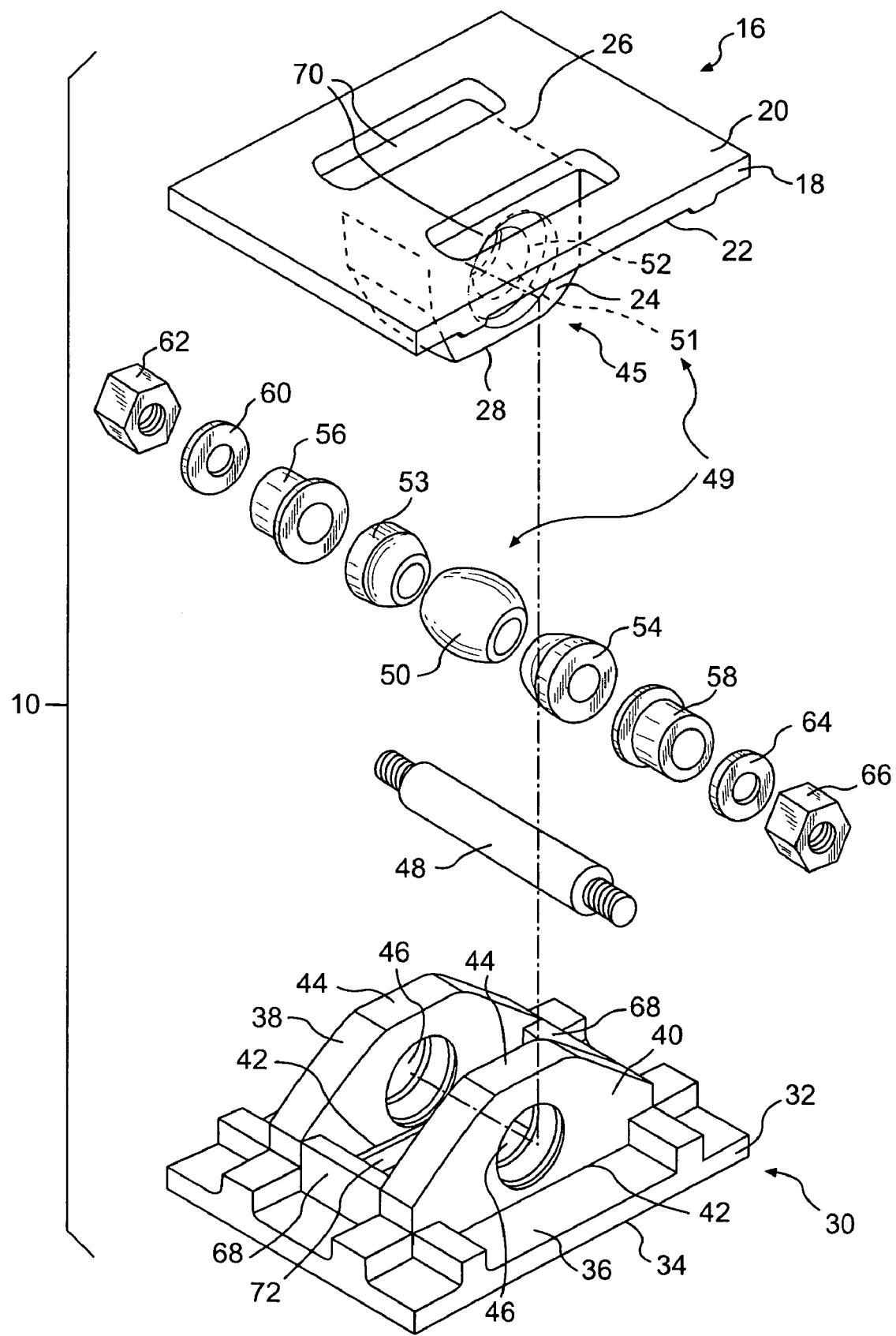
FIG. 2 is a diagrammatic exploded view of a gimbal according to an exemplary disclosed embodiment.

Referring to FIG. 2, gimbal 10 may include an upper lug housing 16, which may include an upper base plate 18 having a top surface 20 and a bottom surface 22. Upper lug housing 16 further includes a downwardly extending first lug 24 attached at its proximal end 26 to bottom surface 22 and protruding from bottom surface 22 to a distal end 28. Gimbal 10 may also include a lower lug housing 30, which may include a lower base plate 32 having a bottom surface 34 and a top surface 36. Lower lug housing 30 may further include an upwardly extending second lug 38 and an upwardly extending third lug 40 attached at their proximal ends 42 to top surface 36 and protruding from top surface 36 to distal ends 44. Although lower lug housing 30 is shown and discussed herein as having two lugs, embodiments of the disclosed gimbal may include a lower lug housing having only a single lug.

First lug 24 may include a thru-hole 45. Second lug 38 and third lug 40 may each have thru-holes 46. A shaft 48 may pass through thru-hole 45 and thru-holes 46 in order to join upper lug housing 16 to lower lug housing 30. Shaft 48 may be mounted in first lug 24 with a hemispherical bearing 49. Hemispherical bearing 49 may include an inner bearing race 50, which may be non-rotatably mounted on shaft 48 between second lug 38 and third lug 40 in any conventional manner. Hemispherical bearing 49 may also include an outer bearing race 51, which may be retained within thru-hole 45 of first lug 24, with any conventional securing arrangement such as a retaining ring 52. (See FIG. 6.) While outer bearing race 51 may remain fixed within first lug 24, inner bearing race 50 may rotate and pivot with respect to outer bearing race 51 in the manner of a universal or ball and socket type joint.

Gimbal 10 may further include a first bearing retaining sleeve 53 and a second bearing retaining sleeve 54 mounted on shaft 48 on either side of inner bearing race 50. A first shouldered collar 56 may be mounted within second lug 38. Similarly, a second shouldered collar 58 may be mounted in third lug 40. First bearing retaining sleeve 53 may abut inner bearing race 50 on one end and first shouldered collar 56 on the other end. Second bearing retaining sleeve 54 may be mounted similarly between inner bearing race 50 and second shouldered collar 58. A first washer 60 may be held against second lug 38 by a first nut 62, which may be threaded onto an end of shaft 48. Similarly, a second washer 64 may be held against third lug 40 by a second nut 66, which may be threaded onto the other end of shaft 48. First nut 62 and second nut 66 may alternatively be collars fixed to shaft 48 by other fixation means such as adhesive, welding, or a shrink-fit.

In an exemplary embodiment, lower lug housing 30 may include reinforcing members 68 spanning between second lug 38 and third lug 40. Reinforcing members 68 may be attached to second lug 38 and third lug 40 by any fixation method, including, for example, gluing, bonding, welding, screwing, etc. Alternatively, reinforcing members may be integral with second lug 38 and third lug 40. For example, part or all of lower lug housing 30 may be formed as a single piece of material (e.g., cast, molded, machined, forged, etc.). Reinforcing members 68 may effectively tie second lug 38 and third lug 40 together. By tying second lug 38 and third lug 40 together, the overall structure of lower lug housing 30 is stiffened, thus reducing deflection under loads of second lug 38 and third lug 40 relative to one another.

Figure 3:
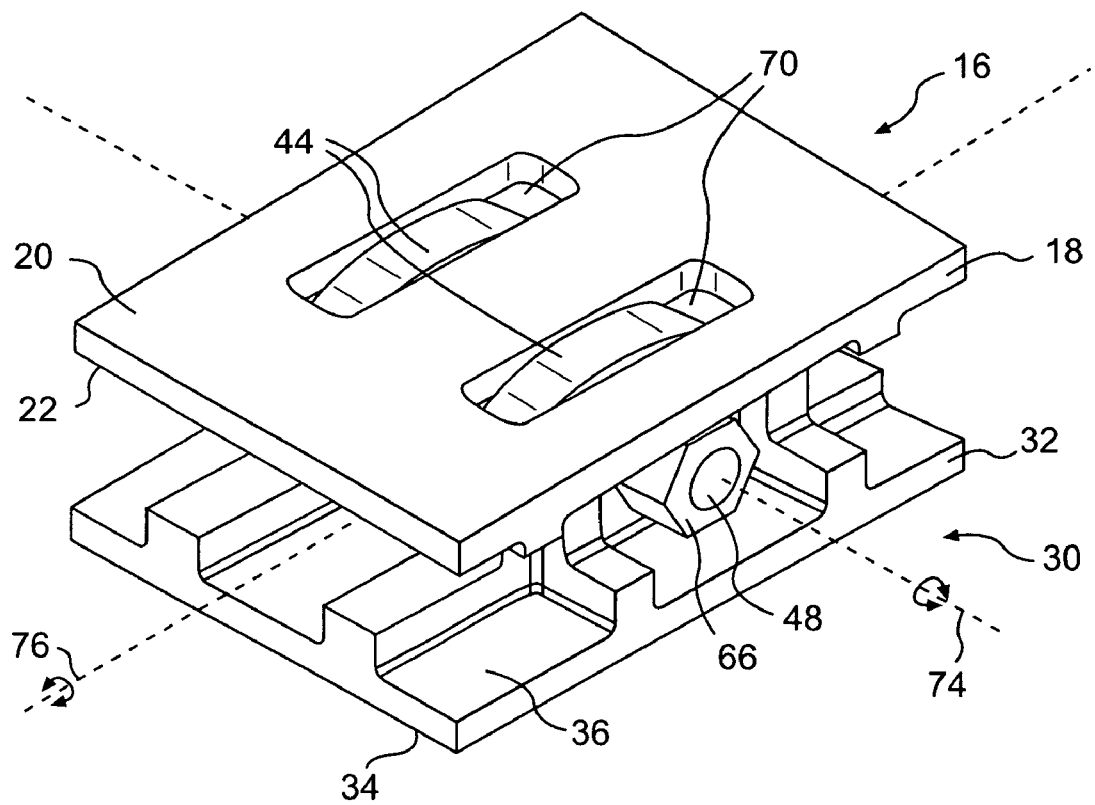
FIG. 3 is a perspective view of the gimbal of FIGS. 1 and 2.

In an exemplary embodiment, upper base plate 18 may include openings or voids 70. When gimbal 10 is assembled, second lug 38 and third lug 40 may extend into voids 70. Similarly, lower base plate 32 may include a void 72, into which first lug 24 may extend. FIG. 3 illustrates distal ends 44 of second lug 38 and third lug 40 residing within voids 70. Voids 70 as well as void 72 may be slots cut through base plates 18 and 32. Alternatively, voids 70 and void 72 may simply be recesses in base plates 18 and 32.

FIG. 3 illustrates the axes of rotation about which upper lug housing 16 and lower lug housing 30 may rotate relative to one another to provide gimbal action. Upper lug housing 16 and lower lug housing 30 may rotate relative to one another, in a longitudinal direction, about an axis 74, through shaft 48. The rotation about axis 74 may occur in both clockwise and counter-clockwise directions. Additionally, hemispherical bearing 49 may permit rotation about an axis 76 through hemispherical bearing 49. The rotation about axis 76 may also occur in both clockwise and counter-clockwise directions.

Figure 4:
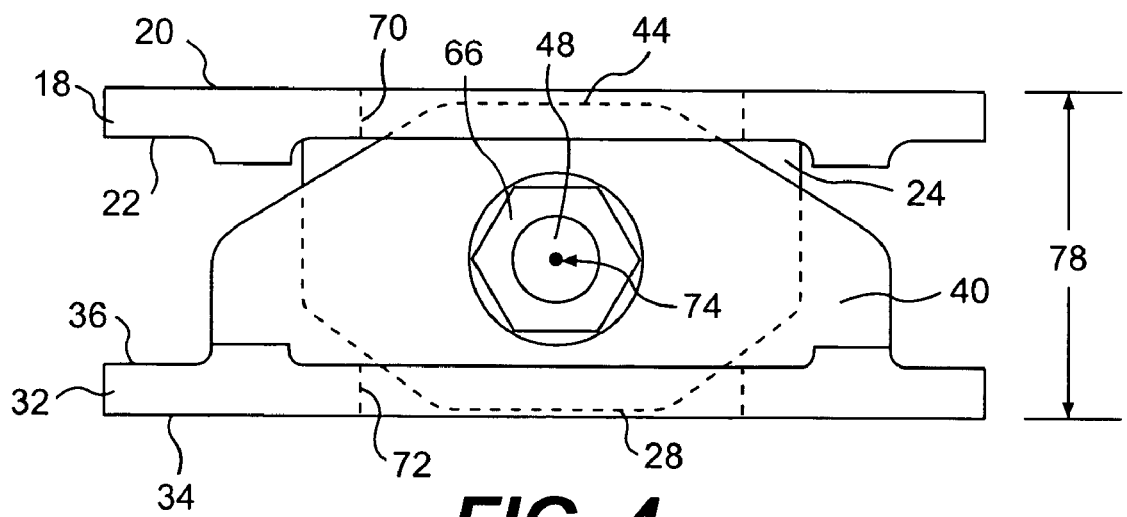
FIG. 4 is a side view of the gimbal of FIGS. 1 and 2.

FIG. 4 is a side view of gimbal 10 showing hidden portions of first lug 24 and third lug 40 in phantom. As shown in FIG. 4, distal end 44 of third lug 40 may extend into one of voids 70, such that distal end 44 is above lower surface 22 of upper base plate 18. Although not shown in FIG. 4, second lug 38 may extend into one of voids 70 in a similar manner. (See FIG. 3.) In addition, distal end 28 of first lug 24 may extend into void 72, such that distal end 28 is above upper surface 36 of lower base plate 32. Voids 70 and void 72 enable upper base plate 18 and lower base plate 32 to be positioned closer together, thus reducing an overall height 78 of gimbal 10.

Reducing height 78 of gimbal 10 may result in lower stresses in gimbal 10 for any given lateral force.

Figure 5:
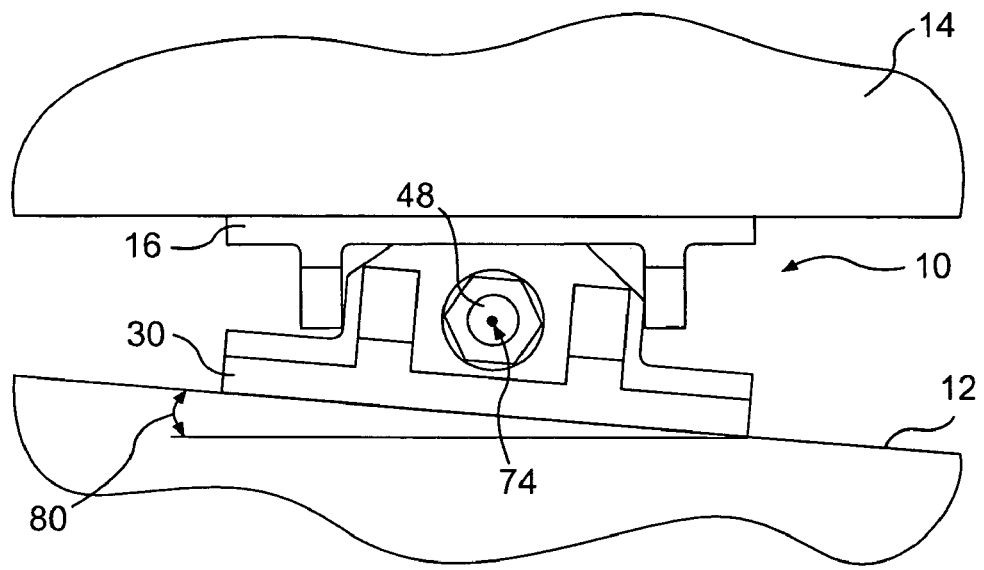
FIG. 5 is a side view of the gimbal of FIGS. 1 and 2 mounted on a tilted surface.
Figure 6:
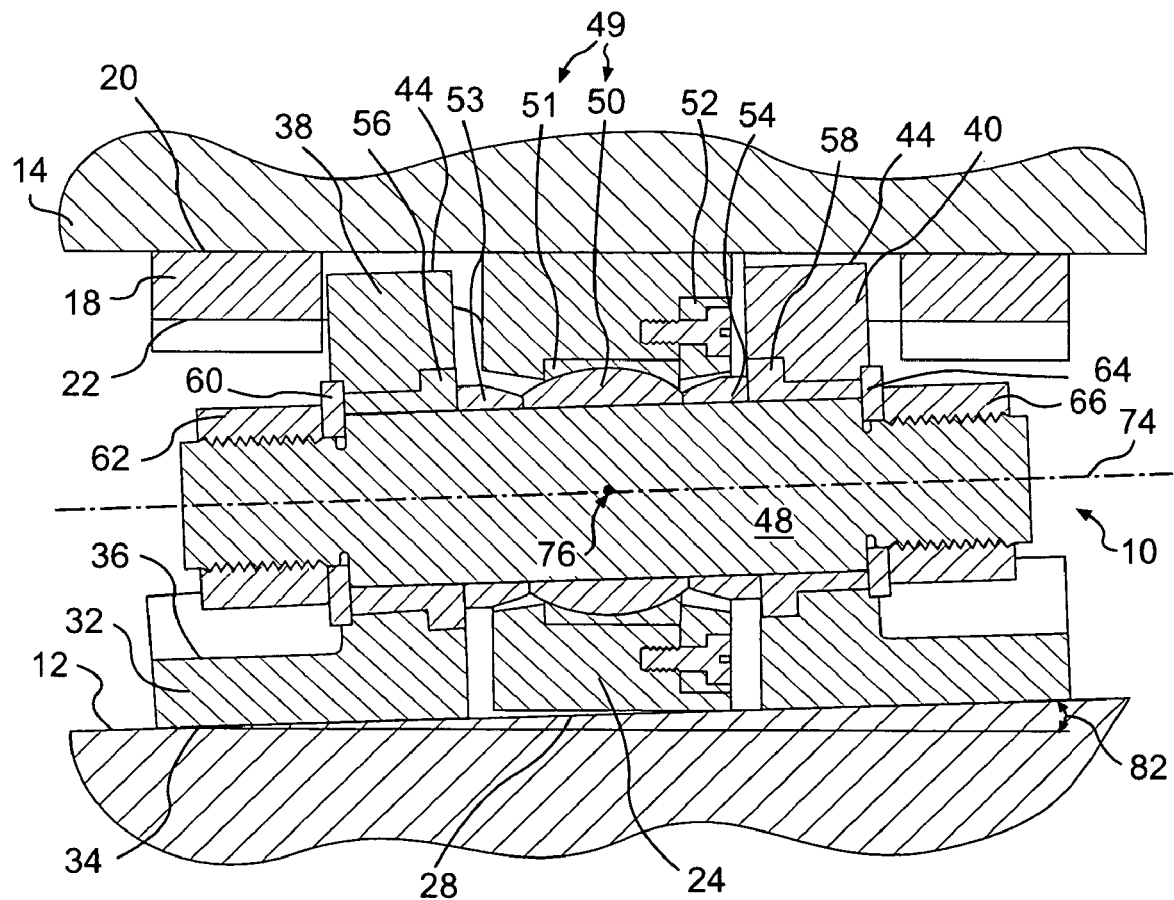
FIG. 6 is a cross-sectional side view of the gimbal of FIGS. 1 and 2 mounted on a tilted surface.
Figure 7:
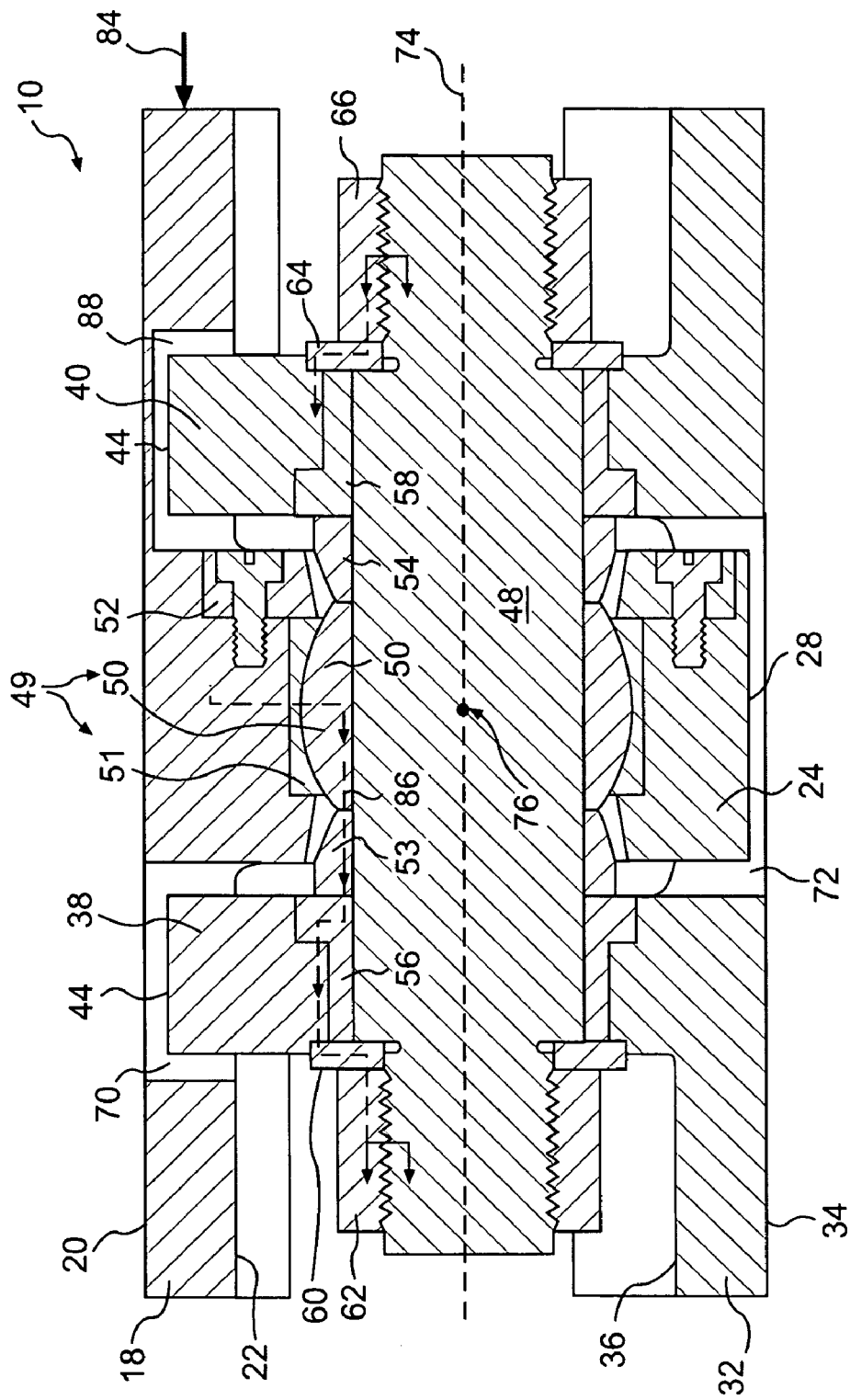
FIG. 7 is cross-sectional side view of the gimbal of FIGS. 1 and 2.

FIGS. 5-7, which are discussed in the following section, illustrate the operation of gimbal 10.

INDUSTRIAL APPLICABILITY

Gimbal 10 may be made from any materials with suitable strength and properties to support object 14, including, for example, metals, plastics, composites, ceramics, etc. Object 14, as well as support surface 12, may be made of any materials rigid enough and sturdy enough to be mounted to gimbal 10. Such materials may include metals, plastics, composites, ceramics, etc.

Gimbal 10 may be of any size, and may be used to mount objects of nearly all sizes and weights. For example, smaller sized gimbals may be used for mounting of instruments, such as gyroscope-containing accelerometers, on satellites, whereas larger, more robust gimbals may be used to mount much heavier equipment, such as gas turbine engines.

Gimbal 10 may be used for mounting, to any support surface 12, any object 14 that is desired to maintain its orientation when support surface 12 flexes or tilts. Although gimbal 10 is shown in the drawings as mounting object 14 on top of support surface 12, gimbal 10 may also be used to suspend objects from a surface, such as a ceiling, or the underside of another object. Similarly, gimbal 10 may also be used to mount objects to vertical surfaces, such as walls, or surfaces at any angle.

More than one gimbal 10 may be used to mount an object. For example, three gimbals may be used to mount large equipment, such as the gas turbine engines mentioned above, to surfaces that flex or otherwise move. Gas turbines are commonly used for generating electrical power for offshore oil rigs. On such rigs, turbines are used to drive electric power generators, which supply electricity to the rigs and some of the equipment on them. In such a configuration, it is important that the output shaft of the turbine remain in alignment with the input shaft of the generator. However, the deck on offshore rigs may flex significantly due to the effect of ocean waves and/or wind on the rig. A set of gimbals may be used to permit this flexing of the deck without disrupting the alignment of the turbine with the generator. In addition, by allowing flexion of the deck, the stresses in the gimbals as well as the supported structure may be reduced.

FIG. 5 is a side view of gimbal 10 mounted on top of support surface 12 and to the bottom of object 14. FIG. 5 illustrates upper lug housing 16 remaining level while lower lug housing 30 is rotated about axis 74 through shaft 48 due to tilting of support surface 12 at an angle 80. FIG. 6 is another side view of gimbal 10 mounted on top of support surface 12 and to the bottom of object 14. FIG. 6 illustrates upper lug housing 16 remaining level while lower lug housing 30 is rotated about axis 76 through hemispherical bearing 49 due to tilting of support surface 12 at an angle 82.

Although upper lug housing 16 and lower lug housing 30 may pivot relative to one another longitudinally and laterally, the housings may pivot in both directions at once, resulting in gimbal action in a generally corner-to-corner direction. Varying degrees of longitudinal and lateral pivoting may result in an infinite number of directions in which gimbal action may occur.

In addition to providing gimbal action, gimbal 10 may be double acting. That is, gimbal 10 may distribute loads and stresses evenly between second lug 38 and third lug 40. FIG. 7 illustrates how forces are transmitted through the components of gimbal 10 in order to share loads between second lug 38 and third lug 40. As upper lug housing 16 is laterally loaded with a force 84, first lug 24 transfers a force to outer bearing race 51, along a dashed line 86, to inner bearing race 50. Force then travels into first bearing retaining sleeve 53 and on into first shouldered collar 56, which is mounted in second lug 38. Force is then transferred to second lug 38. This force on second lug 38 causes it to move (i.e., bend) toward the left. As second lug 38 moves, it pushes on first washer 60, thus transferring force to first washer 60. First washer 60, in turn, transmits force to first nut 62, which is attached to shaft 48 via threads, and thus, applies force to shaft 48. Because force is applied to shaft 48 toward the left, shaft 48 pulls second nut 66 (at the opposite end of shaft 48) with it, thereby applying force to second washer 64, which transmits force to third lug 40.

By suitably sizing first bearing retaining sleeve 53 and second bearing retaining sleeve 54 and/or first shouldered collar 56 and second shouldered collar 58 these components may be provided with a desired stiffness. By providing these components with a particular stiffness the amount of force transferred along the path discussed above may be optimized to evenly distribute loads between second lug 38 and third lug 40. Evenly distributing loads prevents the majority of stress resulting from any particular load from being applied to any one component. By distributing the loads, the stresses are thereby shared, resulting in lower stresses experienced by the individual components. If the device experiences lower stress for a given load, then the device can withstand higher loads. In addition, transferring the force through shaft 48 applies tension to shaft 48. By applying such tension, shaft 48 may tend to straighten, and thus, reduce any bending stress that may be present in shaft 48.

Reducing the distance between the mounting surfaces of a gimbal may also result in lower stresses in the gimbal for any given lateral force. Therefore, reducing height 78 of gimbal 10 may result in lower stresses in gimbal 10. The disclosed apparatus may be provided with a shorter height 78 due to voids 70 and void 72, which permit first lug 24, second lug 38, and third lug 40 to project through them, thus allowing upper base plate 18 and lower base plate 32 to be mounted closer together.

Further to the discussion of voids 70 and void 72, FIG. 7 shows a further view of the positioning of first lug 24 and second lug 38, within void 72 and void 70 respectively. As shown in FIG. 7, first lug 24 may extend into void 72, such that distal end 28 is below the top surface 36 of lower base plate 32. FIG. 7 also illustrates the extension of second lug 38 into void 70, such that distal end 44 of second lug 38 is above bottom surface 22 of upper base plate 18. Although voids 70 and void 72 have heretofore been shown as slots or cutouts through base plates 18 and 32, one or more of voids 70 and void 72 could be recesses. FIG. 7 shows third lug 40 upwardly extending into a recess 88 beyond bottom surface 22 of upper base plate 18.

It will be apparent to those skilled in the art that various modifications and variations can be made to the disclosed low-profile gimbal without departing from the scope of the invention. Other embodiments of the invention will be apparent to those skilled in the art from consideration of the specification and practice of the invention disclosed herein. It is intended that the specification and examples be considered as exemplary only, with a true scope of the invention being indicated by the following claims and their equivalents.

What is claimed is:

1. A gimbal, comprising:
   a first lug housing comprising
      a first base plate having a first surface and a second surface opposite the first surface; and a first lug having a proximal end attached to the second surface of the first base plate, and a distal end distanced from the second surface of the first base plate;

a second lug housing comprising
  a second base plate having a first surface and a second surface opposite the first surface; and
  a second lug and a third lug, each having a proximal end attached to the second surface of the second base plate, and a distal end distanced from the second surface of the second base plate;

a shaft passing through said lugs, thereby connecting the first lug housing to the second lug housing while enabling rotational movement relative to one another about an axis substantially parallel to a longitudinal axis of the shaft, such that the second surface of the first base plate is facing the second surface of the second base plate; the shaft being mounted in at least one of the lugs with a bearing, enabling pivotal movement of the first and second lug housings relative to one another about at least one axis; and a pair of bearing retaining sleeves mounted on the shaft between the bearing and the second and third lugs and configured to assist in distributing loads substantially evenly between the second and third lugs.

2. The gimbal of claim 1, wherein the bearing is a hemispherical bearing, enabling pivotal movement of the first and second lug housings relative to one another about more than one axis.

3. The gimbal of claim 1, further including a reinforcing member spanning between, and attached to the second and third lugs.

4. A gimbal, comprising:
a first lug housing comprising
  a first base plate having a first surface and a second surface opposite the first surface, defining a thickness of the first base plate between the first surface and the second surface of the first base plate; and
  a first lug having a proximal end attached to the second surface of the first base plate, and a distal end distanced from the second surface of the first base plate;
a second lug housing comprising
  a second base plate having a first surface and a second surface opposite the first surface, defining a thickness of the second base plate between the first surface and the second surface of the second base plate; and
  second and third lugs, each having a proximal end attached to the second surface of the second base plate, and a distal end distanced from the second surface of the second base plate;
a shaft passing through the first, second, and third lugs, thereby connecting the first lug housing to the second lug housing, such that the second surface of the first base plate is facing the second surface of the second base plate; and
a first void in the second base plate, opposite the first lug, such that the first lug extends into the first void beyond the second surface of the second base plate;
wherein the first void includes an opening cut completely through the thickness of the second base plate.

5. The gimbal of claim 4, wherein the second lug includes a second lug inner surface facing the third lug and a second lug outer surface facing away from the third lug;
wherein the third lug includes a third lug inner surface facing the second lug and a third lug outer surface facing away from the second lug; and
wherein the first surface of the first lug housing and the first surface of the second lug housing are both substantially planar and extend beyond the second lug outer surface and the third lug outer surface.

6. The gimbal of claim 4, further including a third lug having a proximal end attached to the second surface of the second base plate, and a distal end distanced from the second surface of the second base plate; and
  second and third voids in the first base plate, opposite the second and third lugs, such that the second and third lugs extend into the second and third voids beyond the second surface of the first base plate;
wherein the second and third voids include openings cut completely through the thickness of the first base plate.

7. A gimbal, comprising:
a first lug housing comprising
  a first base plate having a first substantially planar mounting surface and a second surface opposite the first surface, defining a thickness of the first base plate between the first surface and the second surface of the first base plate; and
  a first lug having a proximal end attached to the second surface of the first base plate, and a distal end distanced from the second surface of the first base plate;
a second lug housing comprising
  a second base plate having a first substantially planar surface and a second substantially planar surface opposite the first surface, defining a thickness of the second base plate between the first surface and the second surface of the second base plate; and
  a second lug having a proximal end attached to the second surface of the second base plate, and a distal end distanced from the second surface of the second base plate;
a shaft passing through the first lug and the second lug, thereby connecting the first lug housing to the second lug housing while enabling rotational movement relative to one another about an axis substantially parallel to the longitudinal axis of the shaft, such that the second surface of the first base plate is facing the second surface of the second base plate; and
a first void in the second base plate, opposite the first lug, such that a portion of the first lug extends into the first void beyond the second surface of the second base plate, the first void includes an opening cut completely through the thickness of the second base plate.

8. The gimbal of claim 7, wherein the first lug includes a first surface and a second surface opposite the first surface, the distance between the first and second surfaces defining a maximum width of the first lug;
wherein the shaft passes through the first lug and extends beyond each of the first and second surfaces, and
wherein the void defines a slot-shaped opening having a width dimension and a length dimension, the width dimension being less than two times the maximum width of the first lug.

9. The gimbal of claim 7, further including a third lug on the second lug housing, the third lug having a proximal end attached to the second surface of the second base plate, and a distal end distanced from the second surface of the second base plate;
wherein the shaft passes through the first lug, second lug, and third lug, such that the first lug is disposed about the shaft between the second lug and the third lug.

10. The gimbal of claim 9, further including second and third voids in the first base plate, opposite the second and third lugs, such that a portion of the second lug extends into the second void beyond the second surface of the first base plate and a portion of the third lug extends into the third void beyond the second surface of the first base plate.

11. The gimbal of claim 10, wherein the second and third voids include openings cut completely through the thickness of the first base plate.

12. The gimbal of claim 9, further including a reinforcing member spanning between, and attached to the second and third lugs.

13. The gimbal of claim 7, wherein the shaft is mounted in at least one of the first and second lugs with a hemispherical bearing, enabling pivotal movement of the first and second lug housings relative to one another about more than one axis.

14. The gimbal of claim 13, further including a pair of shouldered collars mounted in the second and third lugs, the shaft being mounted therethrough, wherein the pair of shouldered collars is sized to assist in evenly distributing loads between the second and third lugs.

15. The gimbal of claim 13, further including a pair of bearing retaining sleeves mounted on the shaft between the bearing and the second and third lugs and configured to assist in evenly distributing loads between the second and third lugs.

16. A gimbal, comprising:
   a first lug housing comprising
      a first base plate having a first surface and a second surface opposite the first surface; and
      a first lug having a proximal end attached to the second surface of the first base plate, and a distal end distanced from the second surface of the first base plate;
   a second lug housing comprising
      a second base plate having a first surface and a second surface opposite the first surface; and
      a second lug and a third lug, each having a proximal end attached to the second surface of the second base plate, and a distal end distanced from the second surface of the second base plate;
   a shaft having a first end and a second end and passing completely through said lugs, thereby connecting the first lug housing to the second lug housing while enabling rotational movement relative to one another about an axis substantially parallel to a longitudinal axis of the shaft, such that the second surface of the first base plate is facing the second surface of the second base plate;
   wherein the second lug includes a second lug inner surface facing the third lug and a second lug outer surface facing away from the third lug;
   wherein the third lug includes a third lug inner surface facing the second lug and a third lug outer surface facing away from the second lug;
   wherein the first end and the second end of the shaft extend beyond the second lug outer surface and third lug outer surface, respectively; and
   wherein the shaft is mounted in the first lug with a hemispherical bearing, enabling pivotal movement of the first and second lug housings relative to one another about more than one axis;
   a reinforcing member abutting the second base plate and spanning between, and attached to, the second and third lugs;
   a pair of bearing retaining sleeves mounted on the shaft between the bearing and the second and third lugs;
   a pair of shouldered collars mounted in the second and third lugs, the shaft being mounted therethrough;
   wherein the pair of bearing retaining sleeves and the pair of shouldered collars are sized to assist in evenly distributing loads between the second and third lugs;
   a first void in the second base plate, opposite the first lug, such that the first lug extends into the first void beyond a plane containing the second surface of the second base plate; and
   second and third voids in the first base plate, opposite the second and third lugs, such that the second and third lugs extend into the second and third voids beyond a plane containing the second surface of the first base plate.

17. The gimbal of claim 16, further including a fastener fixed to at least one end of the shaft by at least one of threading, adhesive, welding, and a shrink-fit.

* * * * *